(12) United States Patent
Ansari et al.

(10) Patent No.: US 7,737,725 B1
(45) Date of Patent: Jun. 15, 2010

(54) DEVICE CONTROL REGISTER FOR A PROCESSOR BLOCK

(75) Inventors: Ahmad R. Ansari, San Jose, CA (US); Kam-Wing Li, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 105 days.

(21) Appl. No.: 12/098,400

(22) Filed: Apr. 4, 2008

(51) Int. Cl.
*G06F 7/38* (2006.01)
*H03K 19/173* (2006.01)

(52) U.S. Cl. .......................................... 326/41; 713/100
(58) Field of Classification Search ............. 326/37–41, 326/47; 716/16
See application file for complete search history.

(56) References Cited

U.S. PATENT DOCUMENTS

| | | | |
|---|---|---|---|
| 6,262,596 B1 * | 7/2001 | Schultz et al. ................. | 326/41 |
| 7,266,680 B1 * | 9/2007 | Reinbold ..................... | 713/100 |
| 7,518,396 B1 * | 4/2009 | Kondapalli et al. ........... | 326/38 |

OTHER PUBLICATIONS

U.S. Appl. No. 12/043,097, filed Mar. 5, 2008, Ansari, Ahmad R., et al., entitled "A Processor Block Asic Core for Embedding in an Integrated Circuit", Xilinx, Inc. 2100 Logic Drive, San Jose, California 95124.
UG200 (v1.1), "Embedded Processor Block in Virtex-5 FPGAs", Mar. 31, 2008, 323 pages, Xilinx, Inc. 2100 Logic Drive, San Jose, CA 95124.

* cited by examiner

*Primary Examiner*—Vibol Tan
*Assistant Examiner*—Dylan White
(74) *Attorney, Agent, or Firm*—W. Eric Webostad; Thomas George

(57) ABSTRACT

A device control register controller for a processor block Application Specific Integrated Circuit ("ASIC") core is described. Device control register slave blocks are coupled to the device control register controller and have access to device registers for a plurality of interfaces of the processor block ASIC core. A master device interface is for coupling at least one slave device external to the processor block ASIC core to the device control register controller. A slave device interface is for coupling a master device external to the processor block ASIC core to the device control register controller.

15 Claims, 13 Drawing Sheets

DEVICE CONTROL REGISTER FOR A PROCESSOR BLOCK

FIELD OF THE INVENTION

The invention relates to integrated circuit devices ("ICs"). More particularly, one or more aspects generally relate to a device control register for a processor block Application Specific Integrated Circuit ("ASIC") core.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing a variety of other programmable devices including devices that are only partially programmable. For example, one type of PLD includes a combination of hard-coded transistor logic and a programmable switch fabric that programmably interconnects the hard-coded transistor logic.

Conventionally, embedded processors are designed apart from the PLDs. Such embedded processors are generally not specifically designed for implementation in PLDs, and thus such embedded processors may have operating frequencies that significantly exceed a maximum operating frequency of programmable logic of such PLDs. Moreover, parameters, such as latency, transistor gate delay, data throughput, and the like, designed into the embedded processors may be assumed to be present in the environment to which the embedded processors are to be coupled. Thus even though a PLD may include an embedded processor, such one or more operating parameters of the embedded processor may be substantially disparate from those of programmable logic of the PLD.

For purposes of clarity by way of example and not limitation, an FPGA with an embedded processor is described; however, it should be appreciated that other PLDs, as well as other integrated circuits with programmable logic or other circuitry fabric with less performance than the embedded processor, may likewise be used in accordance with the following description.

Performance of a design instantiated in programmable logic of an FPGA ("FPGA fabric") coupled to an embedded processor may be significantly limited by disparity between operating parameters of the FPGA fabric and those of the embedded processor. Thus, if, as in the past, embedded processor interfaces such as processor local bus ("PLB") interfaces are brought directly out to FPGA fabric, disparity between respective operating parameters of the embedded processor and the FPGA fabric is a significant limitation with respect to overall performance. For example, operations between a memory controller instantiated in FPGA fabric and an embedded processor have heretofore been significantly bottlenecked due to having to wait on the slower memory controller.

Alternatively, to enhance performance, a memory controller instantiated in FPGA fabric may be hardened or provided as an ASIC core coupled to the embedded processor. By hardening a circuit instantiated in FPGA fabric, it is generally meant replacing or bypassing configuration memory cells with hardwired or dedicated connections. Even though the example of a memory controller is used, it should be understood that other peripherals may be hardened or provided as ASIC cores for coupling to an embedded processor. However, as the memory controller or peripheral ASIC or hardened core is not configurable, this reduces overall flexibility. For purposes of clarity by way of example and not limitation, ASIC cores are described even though hardened cores instantiated in FPGA fabric may also be used.

Semiconductor processes and semiconductor process integration rules ("semiconductor process design rules") associated with ASICs are generally more challenging than those associated with FPGAs, and thus yield for such ASICs may be relatively low as compared to yield of FPGAs. FPGAs, which may have a larger and longer run rate than ASICs, may employ semiconductor process design rules that are less aggressive but are more conducive to a higher die per wafer yield than that of ASICs.

It should be understood that an FPGA manufactured with an ASIC core uses FPGA semiconductor process design rules. Thus, ASIC cores manufactured in FPGAs perform worse than such ASIC cores manufactured as standalone ASICs using more aggressive ASIC semiconductor process design rules. Thus, manufacturing FPGAs with ASIC cores conventionally will not achieve competitive performance with standalone ASICs.

For FPGAs provided with ASIC cores that take the place of some FPGA fabric resources, users conventionally are locked into the particular offering of ASIC core memory controllers or peripherals, and have less flexibility of design due to fewer FPGA fabric resources for implementing their circuit design. This loss of flexibility, combined with the fact that such ASIC core memory controllers or peripherals implemented in FPGA fabric, may make FPGAs less attractive to users.

Accordingly, it would be desirable and useful to enhance performance of FPGAs without a significant loss of design flexibility associated with adding an ASIC core.

SUMMARY OF THE INVENTION

One or more aspects of the invention generally relate to a device control register for a processor block Application Specific Integrated Circuit ("ASIC") core.

An aspect relates generally to a processor block Application Specific Integrated Circuit ("ASIC") core having a device control register controller. The device control register slave blocks are coupled to the device control register controller and have access to device registers for a plurality of interfaces of the processor block ASIC core. A master device interface is for coupling at least one slave device external to the processor block ASIC core to the device control register controller. A slave device interface is for coupling a master device external to the processor block ASIC core to the device control register controller.

Another aspect relates generally to a method for device control register ("DCR") addressing, including: performing a first DCR operation to write a first address to a first indirect mode address register; performing a second DCR operation, where the second DCR operation is a write or a read to a second indirect mode address register; selecting the first address stored in the first indirect mode address register for output responsive to the performing of the second DCR operation; partial address decoding the first address; and selecting a first slave control register device responsive to the partial address decoding of the first address. The second indirect mode address register is a proxy for indirect DCR writes and reads.

BRIEF DESCRIPTION OF THE DRAWINGS

Accompanying drawing(s) show exemplary embodiment (s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
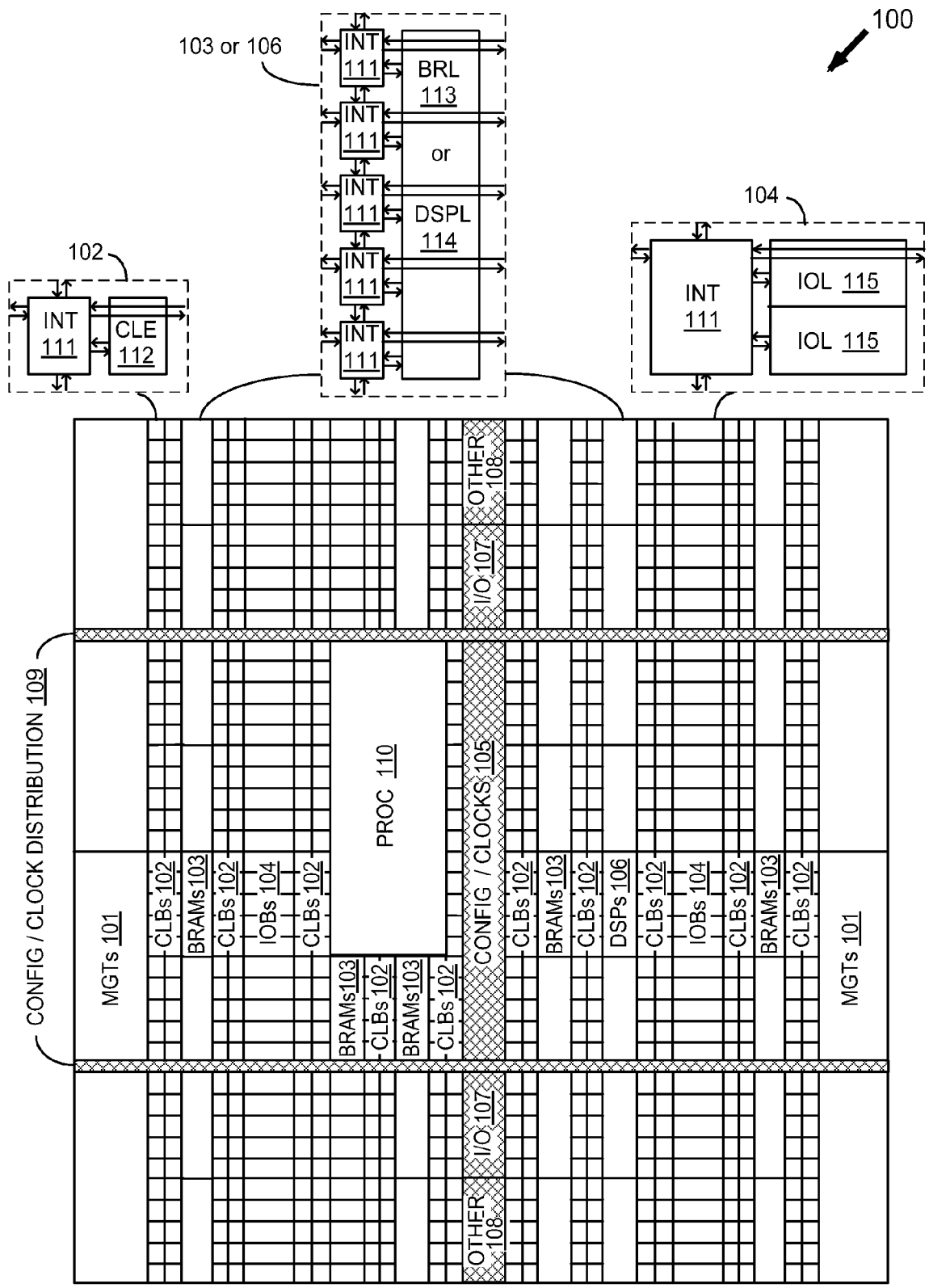
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

As FPGA designs increase in complexity, they reach a point at which the designer cannot deal with the entire design at the gate level. Where once a typical FPGA design comprised perhaps 5,000 gates, FPGA designs with over 100,000 gates are now common. To deal with this complexity, circuits are typically partitioned into smaller circuits that are more easily handled. Often, these smaller circuits are divided into yet smaller circuits, imposing on the design a multi-level hierarchy of logical blocks.

Libraries of pre-developed blocks of logic have been developed that can be included in an FPGA design. Such library modules include, for example, adders, multipliers, filters, and other arithmetic and DSP functions from which complex designs can be readily constructed. These pre-developed logic blocks are in the form of coded text that may be instantiated in programmable logic of the FPGA. The use of pre-developed logic blocks permits faster design cycles, by eliminating the redesign of duplicated circuits. Further, such blocks are typically well tested, thereby making it easier to develop a reliable complex design.

Thus, some FPGAs, such as the Virtex-5™ FGPA available from Xilinx, Inc. of San Jose, Calif., can be programmed to incorporate pre-developed logic blocks with pre-designed functionalities, i.e., "soft cores". A soft core can include a predetermined set of configuration bits that program the FPGA to perform one or more functions. Alternatively, a soft core can include source code or schematics that describe the logic and connectivity of a design. Typical soft cores can provide, but are not limited to, DSP functions, memories, storage elements, and math functions. Some soft cores include an optimally floor-planned layout targeted to a specific family of FPGAs. Soft cores can also be parameterizable, i.e., allowing the user to enter parameters to activate or change certain soft core functionality.

A set or sets of configuration bits used to program programmable logic of an FPGA is conventionally referred to as a configuration bitstream. Programmable logic of an FPGA may include CLBs, PIPs, IOBs, or other programmably configurable logic blocks, interconnects, or inputs/outputs by a configuration bitstream. Register settings may be set via a configuration bitstream; however, hardwired registers are not programmable logic.

Moreover, a hardwired core, such as an ASIC core, is not a soft core. A soft core is instantiated in programmable logic after manufacture of an integrated circuit, whereas a hardwired core is manufactured as part of an integrated circuit. Furthermore, conventionally a hardwired core is thought of as having generally dedicated logic blocks, interconnects, and inputs/outputs, even though a portion of a hardwired core may be set to operate responsive to register settings or other means for configuration or control such as a memory setting or a control line.

Figure 2A:
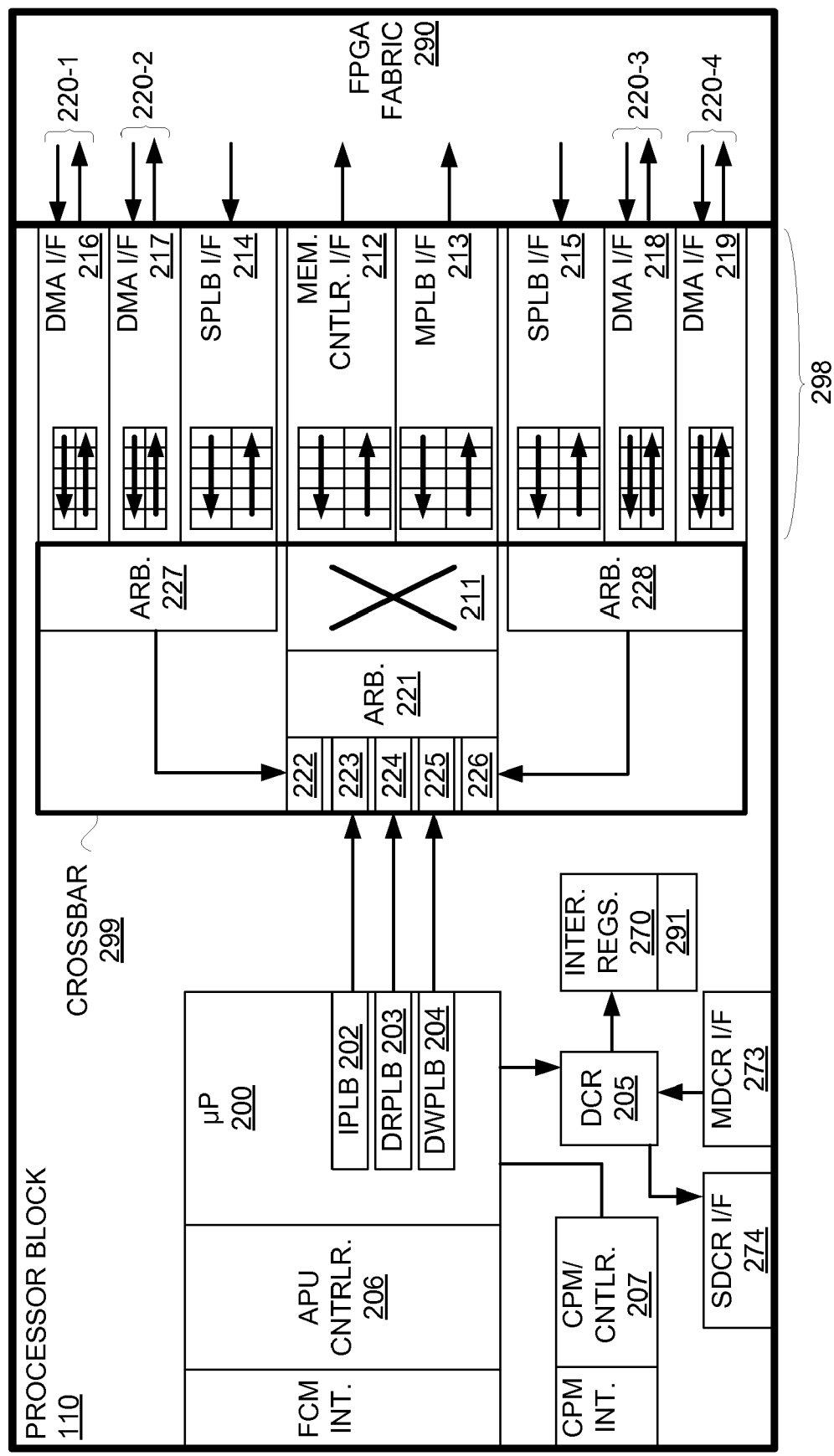
FIG. 2A is a block diagram depicting an exemplary embodiment of an ASIC processor block core ("processor block").

FIG. 2A is a block diagram depicting an exemplary embodiment of an ASIC processor block core ("processor block") 110. Processor block 110 includes an embedded microprocessor core, namely microprocessor 200, which is generally hardwired and designed apart from the FPGA, such as FPGA 100 of FIG. 1, in which processor block 110 may be located.

Microprocessor 200 in this exemplary embodiment includes an instruction processor local bus ("IPLB") 202, a data read PLB ("DRPLB") 203, and a data write PLB ("DWPLB") 204. In this exemplary embodiment, microprocessor 200 is a Power PC, or more particularly a 440 Power PC, available from IBM. However, from the following description, it should be appreciated that other types of microprocessors with other types of interfaces may be used. Moreover, from the following description, it should be appreciated that an ASIC core other than a microprocessor ASIC core may be used.

Components of processor block 110 are generally hardwired such that their performance exceeds that of programmable logic of FPGA fabric 290 to which processor block 110 is coupled. Processor block 110 includes registers, such as internal registers 270, which may be set in order to condition processor block 110 for any of a variety of user selectable configurations, as described below in additional detail.

Either or both an auxiliary processing unit ("APU") control block ("APU controller") 206 and a CPM/control block ("CPM controller") 207 may optionally be coupled to microprocessor 200 as part of processor block 110. A device control register block ("DCR") 205 may be coupled to microprocessor core 200 and may be part of processor block 110. DCR 205 may be used to provide settings to registers controlled by microprocessor core 200 or other registers subject to control by DCR block 205. DCR block 205 may be used to set registers of internal registers 270.

DCR block 205 may be coupled to a master DCR interface ("MDCR interface") 273 and optionally to a slave DCR interface ("SDCR interface") 274. Thus, a user, a circuit design instantiated in FPGA 290, a microprocessor 200, or some other entity may provide register input to internal registers 270 via MDCR interface 273 subject to control of DCR 205. Alternatively, register input may be provided to MDCR interface 273 under control of DCR 205 for registers (not shown for purposes of clarity) external to processor block 110 coupled via SDCR interface 274. Such external registers may be instantiated in FPGA fabric 290.

Arrows in FIG. 2A indicate the direction of a transaction. Thus, for example, register input provided to DCR 205 may be from a transaction initiated by microprocessor 200 or from a master device (not shown for purposes of clarity) coupled to MDCR interface 273. Such transaction may pass through DCR 205 to SDCR interface 274 or to internal registers 270.

One or more master devices (not illustratively shown in FIG. 2), other than microprocessor 200, may be instantiated in FPGA fabric 290, may be other ASIC cores of FPGA 100, or may be external ICs coupled to FPGA 100, or any combination thereof. Such master devices external to processor block 110 may be coupled thereto via a direct memory access ("DMA") interface block, such as DMA interface blocks ("DMA interfaces") 216 through 219, or a slave PLB interface block ("SPLB interface"), such as SPLB interfaces 214 and 215. Thus, with respect to transaction origination, DMA interfaces 216 through 219 and SPLB interfaces 214 and 215 may generally be thought of as FPGA fabric 290-to-crossbar 299 bridges, and memory controller interface block ("memory controller interface") 212 and master PLB interface block ("MPLB interface") 213 may generally be thought of as crossbar 299-to-FPGA fabric 290 bridges. DMA interfaces 216 and 219 may be coupled to FPGA fabric by local links 220-1 through 220-4, respectively. DMA interfaces 216 through 219, SPLB interfaces 214 and 215, memory controller interface 212 and MPLB interface 213 are collectively referred to herein as "interfaces 298."

Transactions may be initiated by microprocessor 200 as indicated by arrows respectively from IPLB 202, DRPLB 203, and DWPLB 204. However, it should be understood that a transaction issued by microprocessor 200 may result in data being provided to microprocessor 200 responsive to such an issued transaction.

A crossbar 299 is part of processor block 110. Crossbar 299 includes address decoder blocks ("decoders") 222 through 226, arbitration block ("arbiter") 221, crossbar switch ("switch") 211, and arbitration blocks ("arbiters") 227 and 228. IPLB 202, DRPLB 203, and DWPLB 204 are respectively coupled to decoders 223 through 225. Decoders 222 through 226 are respectively coupled to arbiter 221. Arbiter 221 is coupled to switch 211. Decoders 222 through 226 decode addresses associated with transactions, and transactions with decoded addresses are provided to arbiter 221 for arbitrating access to switch 211. The decoded addresses for transactions having been granted access to switch 211 are used to route such transactions to memory controller interface 212 or MPLB interface 213.

Memory controller interface 212 and MPLB interface 213 are both part of processor block 110. One or more of SPLB interfaces 214 and 215 are part of processor block 110, and one or more of DMA interfaces 216 through 219 may optionally be part of processor block 110.

Crossbar switch 211 is coupled to memory controller interface 212 and MPLB interface 213. Memory controller interface 212 may be coupled to FPGA fabric 290. Likewise, MPLB interface 213 may be coupled to FPGA fabric 290. Thus, for example, microprocessor 200 may issue an instruction transaction, a read transaction, or a write transaction which is respectively decoded by decoder 223, 224, or 225 to provide target addresses, which may be for either or both memory controller interface 212 or MPLB interface 213. A decoded address is used by switch 211 once access to switch 211 for such decoded address is granted by arbiter 221. Thus, switch 211 responsive to a decoded address provides such address for example to memory controller interface 212 to access a memory controller device coupled thereto or to MPLB interface 213 to access a peripheral device coupled thereto.

Each of interfaces 212 through 219 includes an inbound first-in, first-out buffer ("FIFO") and an outbound FIFO. Thus, for example, even though the direction of a transaction is directed to memory controller interface 212 or MPLB interface 213 such as originating from microprocessor 200 or FPGA fabric 290, it should be appreciated that data or other information flow associated with such a transaction may be in either or both input and output directions. Thus, crossbar 299 is bidirectional, as described below in additional detail.

Master devices, such as other ASIC cores, other processors whether instantiated in FPGA fabric 290 or as ASIC cores, or other circuits whether ASIC cores or instantiated in FPGA fabric 290, may be coupled to processor block 110 via any of DMAs 216 through 219 or SPLB interfaces 214 or 215. It is not necessary that all transactions proceed to memory via memory controller interface 212. Thus, a master device may be coupled for example to DMA interface 216 for executing a transaction utilizing a slave device, which may be a memory controller or a peripheral device, coupled to MPLB interface 213. Moreover, a master device coupled to SPLB interface 215 may issue a transaction to a slave device coupled to MPLB interface 213. It should, however, be understood that excluding transactions initiated by microprocessor 200, transactions from master devices coupled to any of DMA interfaces 216 through 219 or any of SPLB interfaces 214 and 215 go into crossbar 299 and then via either memory controller interface 212 or MPBL interface 213 to a memory controller or to one or more other slave devices, respectively, coupled thereto. Moreover, transactions may go from FPGA fabric 290 to memory controller interface 212 or MPBL interface 213 and then to any of local links 220-1 through 220-4 via DMA interfaces 216 through 219, respectively. In short, transactions go into and out of crossbar 299 and interfaces 298 of processor block 110, and thus crossbar 299 and interfaces 298 in combination may be thought of as a bridge or bridges.

DMA interfaces 216 through 219 and SPLB interfaces 214 and 215 are "slave" interfaces. More particularly, DMA interfaces 216 through 219 are controlled via a DCR interface, described below in additional detail, for servicing microprocessor 200 or another master device coupled via such a DCR interface. SPLB interfaces 214 and 215 have coupled to them a master device, which is external to processor block 110, such as may be instantiated in FPGA fabric 290. However, memory controller interface 212 and MPLB interface 213 are "slave" interfaces with respect to microprocessor 200, DMA interfaces 216 through 219, and SPLB interfaces 214 and 215, as memory controller interface 212 and MPLB interface 213 each service microprocessor 200, and one or more master devices coupled via DMA interfaces 216 through 219 or SPLB interfaces 214 and 215. Memory controller interface 212 and MPLB interface 213 are master interfaces with respect to "slave" devices coupled thereto via buses external to processor block 110.

Memory mapping may be done with a configuration bitstream to set register values. These register values may be set in internal registers 270. Alternatively, rather than or in addition to setting register values using a configuration bitstream, DCR operations may be used to set register values. However, memory mapping for some user designs may not change, and thus setting register values by configuration bitstream may be sufficient in some applications. Each of memory controller interface 212 and MPLB interface 213 may thus be address programmable.

Moreover, this memory mapping is flexible. It should be understood that because address spaces for a user design to be instantiated into FPGA fabric 290 may vary from user to user, such address spaces are not fixed. Rather, a user may program the memory map for processor block 110 via a configuration bitstream, or alternatively via DCR 205. However, programmed memory address spaces may be changed via DCR 205 after programming via a configuration bitstream. An example of memory mapping may include setting an address in a memory map of memory controller interface 212 for booting microprocessor 200 from flash memory located at such address and coupled to memory controller interface 212. Another example of memory mapping may be setting a portion of the memory address range that may be mapped to MPLB interface 213 for accessing peripherals.

Features set via configuration registers of processor block 110, such as for example threshold data accumulation size, arbitration protocol, address mapping, priority assignment, error handling, and activation/deactivation of write posting, are accessible via MDCR interface 273. MDCR interface 273 is a slave DCR interface that allows the coupling thereto of one or more master devices external to processor block 110. Therefore, transactions generated by external master devices may come through MDCR interface 273 for use of crossbar 299, as described below in additional detail. On the other hand, SDCR interface 274 is capable of passing generated transactions to one or more soft DCR slave devices, described below in additional detail.

This facilitates use of processor block 110 in a multiprocessor system. For example, via MDCR interface 273 and DCR 205 another embedded processor in FPGA 100 or a soft processor instantiated in FPGA fabric 290 may be a master device that uses crossbar 299 and one or more of interfaces 212 and 213, with or without microprocessor 200 being involved. Additionally, default values for configuration of internal registers 270 of processor block 110 may be programmed into configuration memory cells 291 coupled to internal registers 270. Such default values may be programmed into memory cells 291 via a configuration bitstream. Thus, immediately upon a reset of processor block 110, default values may be loaded from memory cells 291 into configuration registers 270.

A DCR bus may be for a Power PC microprocessor available from IBM. Accordingly, the "CoreConnect Bus Architecture" and the "Device Control Register Bus Architecture Specifications" from IBM indicate use of a DCR bus for device configuration, as well as control and status accesses. The CoreConnect Bus Architecture may be used for a system on a chip. The following description provides use of various DCR blocks within processor block 110.

Figure 2B:
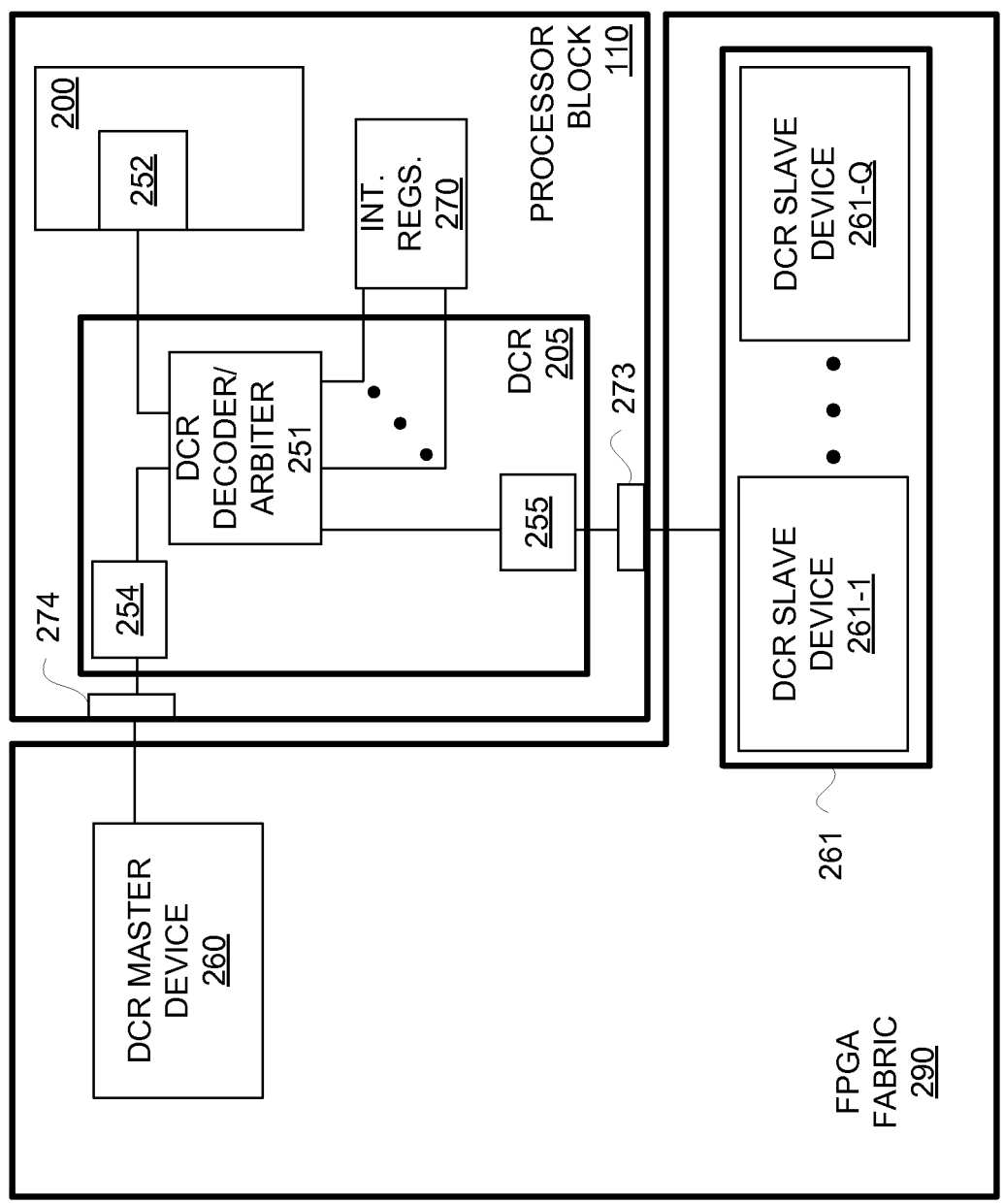
FIG. 2B is a block diagram depicting an exemplary embodiment of the processor block of FIG. 2A coupled to device control register block ("DCR") devices.

FIG. 2B is a block diagram depicting an exemplary embodiment of processor block 110 of FIG. 2A coupled to DCR devices. Microprocessor 200 includes a DCR port 252, and DCR port 252 may be coupled to DCR decoder/arbiter ("decoder") 251 of DCR 205. DCR decoder 251 is coupled to internal registers 270, and is coupled to a sync block 254, and a sync block 255. Sync block 254 is coupled to DCR master interface 274. DCR master interface 274 may be coupled to a soft DCR master device, namely a DCR master device 260 instantiated in FPGA fabric 290.

Sync block 255 is coupled to DCR interface 273. DCR interface 273 may be coupled to one or more soft DCR slave devices 261, namely DCR slave devices 261-1 through 261-Q for Q a positive integer greater than zero, instantiated in FPGA fabric 290. Sync block 255 may be thought of as a master sync block, and sync block 254 may be thought of as a slave sync block.

A DCR transaction initiated by a DCR master, namely microprocessor 200 or soft DCR master 260, is partially decoded by decoder 251, which includes arbitration logic to arbitrate among DCR masters. Such a DCR transaction may be for one or more of DCR slave device 261-1 through 261-Q or may be for setting or resetting configuration of internal status and configuration registers, namely internal registers 270.

Figure 3:
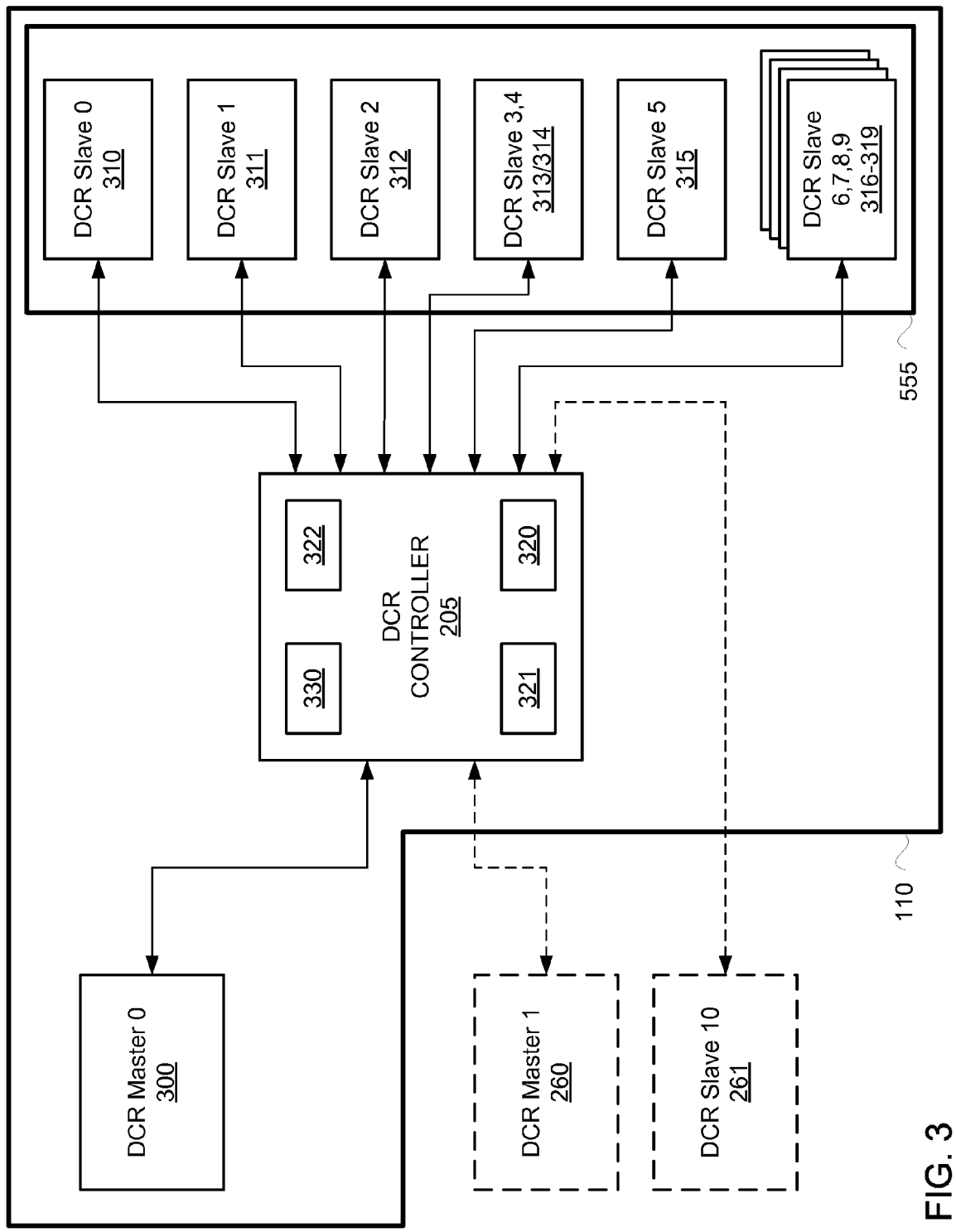
FIG. 3 is a block diagram depicting an exemplary embodiment of a variety of DCR blocks that may be used within the processor block of FIG. 2A.

If such DCR transaction is for a DCR crossbar interface 555 of FIG. 3 as determined after partially decoding, then such partially decoded DCR transaction is presented to DCR crossbar interface 555 of FIG. 3. The PLB address range is independent of the DCR address range associated for example with DCR slave devices 261. Thus, soft DCR master device 260 may read or modify configuration of crossbar 299 and interfaces 298 by issuing DCR read or write commands, respectively. Moreover, soft DCR master device 260 may issue one or more transactions for one or more of soft DCR slave devices 261.

It should be understood that decoder 251 partially decodes commands to obtain one or more addresses for configuration settings for crossbar 299 or interfaces 298. However, decoder 251 may fully decode commands to obtain addresses and other information for soft DCR slave devices 261.

FIG. 3 is a block diagram depicting an exemplary embodiment of a variety of DCR blocks 310 through 319 that may be used within processor block 110 of FIG. 2A. DCR blocks 310 through 319 provide DCR crossbar interface 555, as well as an interface to microprocessor 200. While DCR crossbar interface 555 is not illustratively shown in FIG. 2A for purposes of clarity, it should be understood that interfaces may be present in each functional block associated with DCR blocks 310 through 319.

DCR master 0 block 300 is coupled for bidirectional communication with DCR block or controller 205. DCR master 0 block 300 is for microprocessor 200, and is conventional.

Each of DCR slave 0 through slave 9 blocks 310 through 319 is coupled for communication with DCR controller 205. DCR slave 0 block 310 is associated with APU controller 206. DCR slave 1 block 311 is associated with memory controller interface 212. DCR slave 2 block 312 is associated with crossbar 299. DCR slave 3 block 313 and DCR slave 4 block 314 are respectively associated with SPLB interfaces 214 and 215. DCR slave 5 block 315 is associated with MPLB interface 213. DCR slave 6 block 316 through DCR slave 9 block 319 are respectively associated with DMA engines, namely DMA interfaces 216 through 219.

Optionally, an external master device, such as DCR master device 260 of FIG. 2B, may be coupled to DCR controller 205, and thus a DCR "master 1" block 260 may optionally be coupled to processor block 110. Furthermore, an optional DCR slave 10 block 261 may be associated with one or more DCR slave devices, such as DCR slave devices 261-1 through 261-Q of FIG. 2B. DCR slave 10 block is external to processor block 110. An address from a master device falling outside a gasket DCR address range of DCR controller 205 may be directed to DCR slave 10 block 261.

A mix of daisy chain and distributed-OR DCR bus topology may be used within processor block 110. In a daisy chained topology, data buses of DCR blocks may be daisy chained together. In a distributed-OR bus topology, data outputs of DCR slave blocks may be logically ORed together to form a final output which is sent to a DCR master device, whether such DCR master device is internal or external to processor block 110. These topologies are described below in additional detail. Furthermore, all transfer acknowledgment signals from DCR slave 0 block 310 through DCR slave 9 block 319 may be logically ORed together and sent to an appropriate DCR master device via either DCR master 0 block 300 or DCR master 1 block 260.

It should be appreciated that in addition to having optional external master and slave blocks coupled to DCR controller via DCR master 1 block 260 and DCR slave 10 block 261, respectively, some or all of DMA interfaces 216 through 219 may be omitted. Additionally, if MPLB interface 213 is not present, both of SPLB interfaces 214 and 215 may be omitted or may be used just for communication with memory controller interface 212. Furthermore, if memory controller interface 212 is omitted, SPLB interfaces 214 and 215 may be for communication with only MPLB interface 213. However, at least one of memory controller interface 212 and MPLB interface 213 is present. Furthermore, even though one SPLB interface may be present, such as SPLB interface 214, the addition of another SPLB interface, such as SPLB interface 215, may be optional. So, for example, APU controller 206 may be omitted, and thus it should be appreciated that DCR slave 0 block 310 may not be present if APU controller block 206 is not present. While DCR slave 2 block 312 would be present as crossbar 299 is always present, one or more of DCR slave 1 block 311 and DCR slave 3 block 313 through DCR slave 9 block 319 may be omitted depending on which of the corresponding interfaces are not present.

It should be appreciated that DCR controller 205 is situated between one or more master devices and slave devices such that commands from one or more DCR master devices are sent through DCR controller 205 to DCR slave devices. Moreover, responses from DCR slave devices are sent to DCR master devices via DCR controller 205. Along those lines, DCR controller 205 is configured to carry out partial DCR address decoding to determine for which DCR slave device a DCR read/write command is targeted. Accordingly, DCR controller 205 may include a processor block DCR address map 330. Thus, each of blocks 310 through 319 may have associated therewith an address offset and address range. Furthermore, DCR controller 205 may have a DCR controller status and control register 322, an indirect mode access register 321, and an indirect mode address register 320.

DCR controller 205 may be configured to support both direct and indirect addressing modes. In a direct addressing mode there may be a multiple bit address space to define a plurality of locations. In an indirect addressing mode, there may be a multiple bit address space which is expanded beyond the address space of the direct accessing mode to define more locations than that defined by the direct addressing mode. For purposes of clarity by way of example and not limitation, it shall be assumed that the direct addressing mode has a 10-bit address space capable of defining 1,024 locations. For the indirect addressing mode, it shall be assumed that there is an expanded address base defined by a 12-bit DCR address space capable of defining 4,096 locations, where the DCR address space is the same as in the direct addressing mode and is always located inside the first 1,024 locations. However, it should be appreciated that other values may be used provided however that the indirect addressing mode is a larger address space than the direct addressing mode.

For an indirect addressing mode, a DCR slave address may be defined by the content in indirect mode address register 320 rather than over a DCR address bus. More particularly, indirect addressing may be carried out through two dedicated DCR locations at address offsets associated with indirect mode address register 320 and indirect mode access register 321, namely the address offsets respectively associated with those two registers. As both locations for registers 320 and 321 are accessible only through direct addressing, such locations may be the only two DCR locations of the entire DCR address space that cannot be accessed through indirect addressing.

There are two operations for performing indirect addressing. First, through direct addressing of a 12-bit target DCR address, a write may be to the address offsets associated with indirect mode address register 320. This write triggers an autobus lock action to reserve an associated bus for indirect access. DCR controller 205 may be configured for such autobus lock assertion. Secondly, a read or write to the offset address associated with indirect mode access register 321, again through direct addressing, may be performed as if reading or writing, respectively, to the target DCR address specified in the first write operation. This read or write releases an autobus lock action if such autobus lock is triggered. The second operation does not need to occur immediately after the first operation. Thus, once a target address is written to the indirect mode address register 320, such target address stays there until overwritten by another value.

The 12-bit DCR address may consist of a 2-bit DCR upper address bus address and a 10-bit DCR address bus address. For purposes of clarity by way of example and not limitation, it shall be assumed that there are 256 processor block DCR registers that are reserved within the first 1,024 locations for both direct and indirect addressing.

Figure 4A:
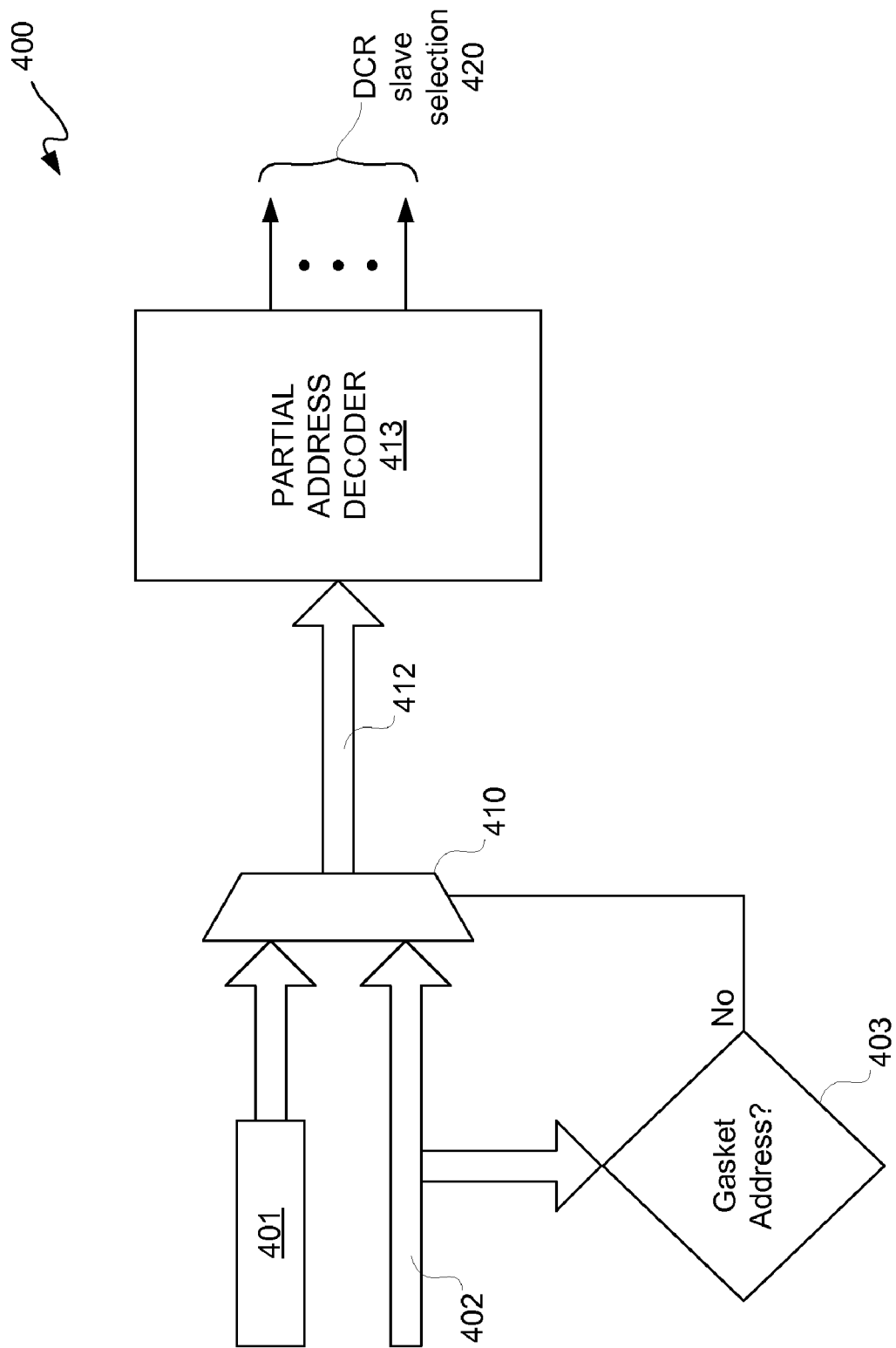
FIG. 4A is a flow diagram depicting an exemplary embodiment of a direct addressing flow.
Figure 4B:
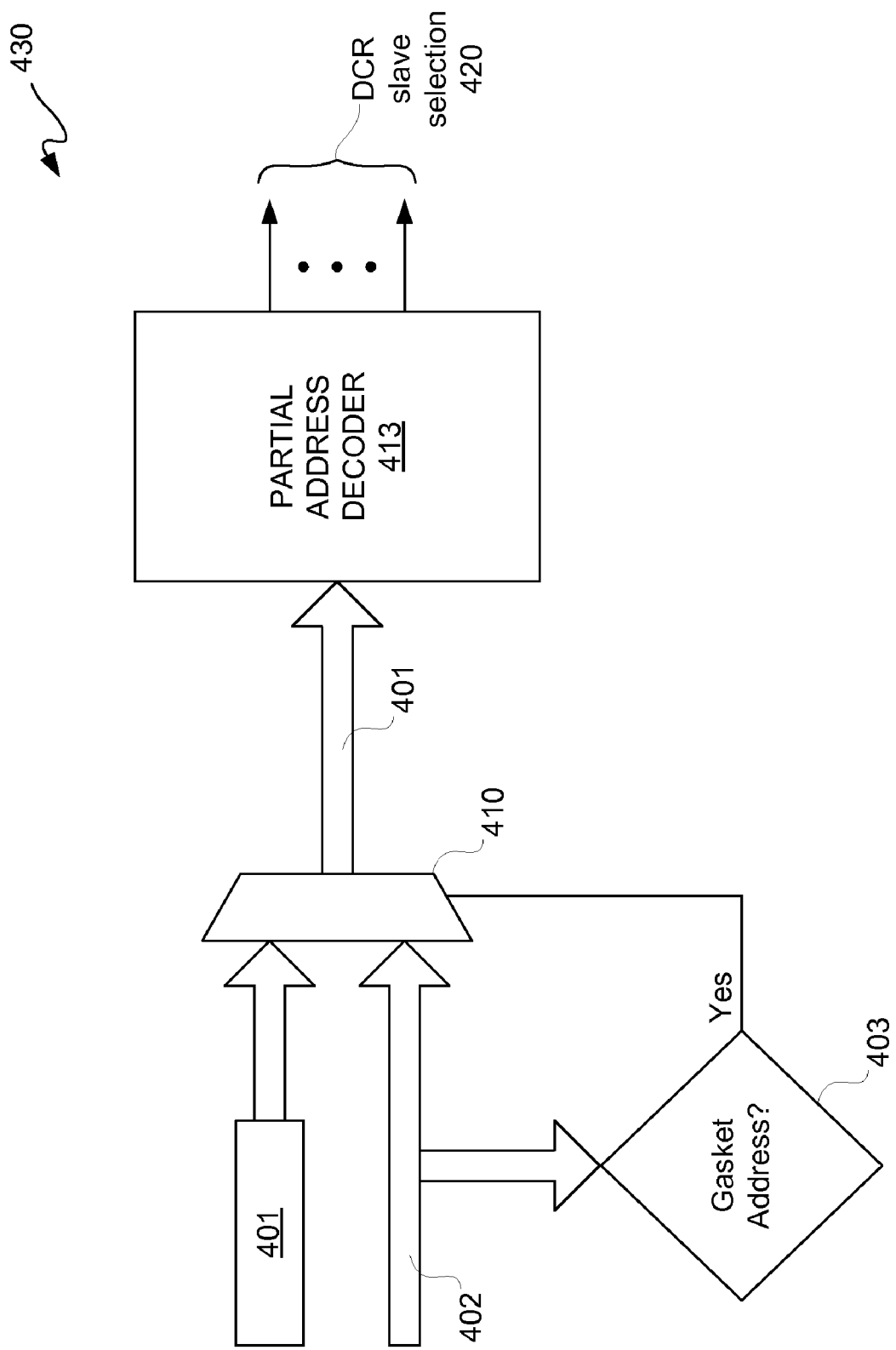
FIG. 4B is a flow diagram depicting an exemplary embodiment of an indirect addressing flow.

FIG. 4A is a flow diagram depicting an exemplary embodiment of a direct addressing flow 400, and FIG. 4B is a flow diagram depicting an exemplary embodiment of an indirect addressing flow 430. With ongoing reference to FIGS. 2A, 2B, and 3, addressing flows 400 and 430 are further described. With reference to FIG. 4A, a target address 401 is stored in indirect mode address register 320. Address 401 is provided as an input to multiplexer 410. Also provided to multiplexer 410 is a DCR address bus input 402, namely the previously described 10-bit address. A portion of the address of DCR address bus input 402 may be used to determine an outcome of a decision operation at 403. Gasket address determination at 403 determines whether the DCR address bus input 402 is for a gasket address, namely an address of indirect mode access register 321. For direct addressing flow 400, the result of the gasket address determination at 403 is negative as indicated. Output of such gasket address determination at 403 is provided as a control select signal to multiplexer 410.

For purposes of clarity by way of example and not limitation, it shall be assumed that indirect mode address register 320 has an address offset and range of 0x00, and indirect mode access register 321 has an address offset and range of 0x01. Thus, if DCR address bus input 402 is not 0x01, then the output of multiplexer 410 may be the 10-bit DCR address bus input 402 which may be preceded by a 2-bit value of 00 to indicate direct addressing. This modified address output 412 from multiplexer 410 may be provided to partial address decoder 413. Partial address decoder 413 may be coupled to DCR slaves, such as DCR slave 0 block 310 through DCR slave 9 block 319 as well as DCR slave 10 block 261, generally indicated as DCR slave selection 420. Thus, partial address decoder 413 may identify for which DCR slave block the modified DCR address bus output 412 is targeted.

With reference to FIG. 4B, for indirect addressing flow 430, the same flow is used, except that DCR address bus input 402 is for a gasket address, in the example address 0x01, as determined by gasket address determination at 403. Accordingly, the control select signal provided to multiplexer 410 selects a target address 401 stored in indirect mode address register 320 for outputting target destination address 401 from multiplexer 410 to partial address decoder 413. Thus, even though DCR slave blocks internal to processor block 110 may be limited to 10-bit addresses, the 12-bit address stored as a target destination address 401 may be passed from partial address decoder 413 to external DCR slave 10 block 261. In other words, all addresses outside the gasket DCR range may be passed outside of processor block 110, which in this example may be 12-bit addresses. Thus, indirect addressing may be used to increase the addressable range of DCR slave blocks.

To recapitulate, there are two dedicated DCR registers used specifically for indirect addressing, which generally may be referred to as Register X and Register Y. Register X in the exemplary embodiment holds a 12-bit indirect address, and Register Y is used as a proxy for performing an indirect write or an indirect read operation.

For an indirect write operation to a DCR location P, a DCR write to Register X with value P is performed. Then, a DCR write to Register Y is performed. Register Y has a meaning in the design, namely when Register Y is visible to the circuit, the circuit knows it is in an indirect address mode. Thus, the question regarding gasket address at 403 may be replaced with the question indirect address mode. A yes to the question indirect address mode causes multiplexer 410 to select Register X contents, namely target address 401, as the output from multiplexer 410 used to drive partial address decoder 413. In sum, for Register X used to establish an indirect address, Register Y is used to specify an indirect address mode write to the location specified in Register X.

For an indirect read operation to a DCR location P, the steps are as above, except a DCR read to Register Y is performed instead of a DCR write thereto. Hence, whenever reading from or writing to Register Y, partial address decoder 413 uses the contents of Register X as the address for decoding.

In a direct address mode, Register Y is not read from or written to. If there is no reference to Register Y such as by a DCR read or write, the answer at 403 is no. Thus, the DCR address input 402 is selected as the output from multiplexer 410 that drives partial address decoder 413. In direct addressing, target address 401 need not be setup in Register X.

For example, a DCR write to location P means that DCR address bus input 402 will contain P. Location or address P is selected for output from multiplexer 410 for driving partial address decoder 413. In the direct address mode, address P may be thought of as a 10-bit direct address as a 12-bit address with the 2 MSBs being set to 0s.

Figure 5:
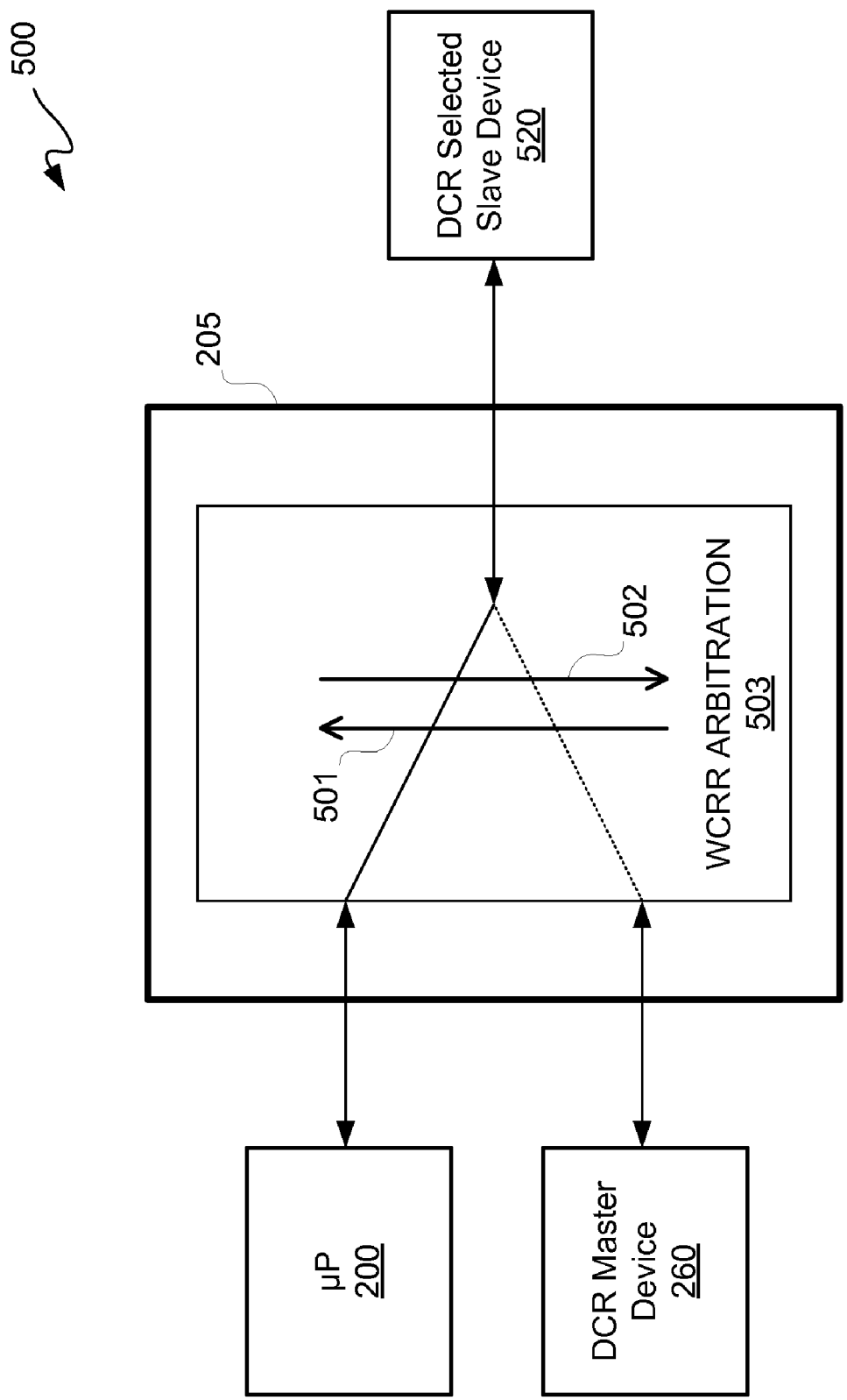
FIG. 5 is a block/flow diagram depicting an exemplary embodiment of a dual DCR master arbitration flow.

FIG. 5 is a block/flow diagram depicting an exemplary embodiment of dual DCR master arbitration flow 500. Dual DCR master arbitration flow is described with simultaneous reference to FIGS. 2A, 2B, 3, 4A, 4B, and 5. If only one of either DCR master device 0, namely microprocessor 200, or DCR master device 1, namely DCR master device 260, is active, then such active master device may have all available DCR bandwidth via DCR controller 205. On the other hand, if both master devices 200 and 260 are active, only one of such master devices may gain access to a DCR slave at a time through DCR controller 205.

DCR controller 205 is configured for work-conserving round robin ("WCRR") arbitration, where a master device that has just accessed a DCR slave device may have a lower priority for a subsequent access unless the other master device does not have a pending access request for a DCR slave device, as generally indicated by arrows 501 and 502 of WCRR arbitration block 503. Thus, a selected DCR slave device 520 which may be any of the DCR slave devices described with reference to FIG. 3, may be accessed after being granted bandwidth via DCR controller 205. However, WCRR arbitration block 503 may be deactivated if a master device locks a bus, such as for one or more atomic operations.

The consequence of having the possibility of two DCR master devices active at the same time is that they may attempt to access a same DCR slave location one right after another. To avoid data incoherence due to such a possible sequence of operations, DCR controller 205 may provide a bus locking mechanism. Thus, a master device may lock busing to a DCR slave device 520 such that it has exclusive access to such DCR slave device. Furthermore, such busing may be locked for exclusive access to more than one DCR slave device 520 at a time. Thus the other DCR master device waits until the master device having locked the bus releases such lock. DCR controller 205 may be configured with two types of bus locking, namely a "normal" bus lock and an "auto" bus lock.

A master device, such as microprocessor 200 or external master device 260, that wants to lock busing for communication to one or more DCR slave devices via DCR controller 205 writes a bit to status and control register 322. If busing of DCR controller 205 has already been locked by a master device, an attempted lock by another master device may or may not be successful depending on whether the subsequent master device supports a timeout wait operation and how long the master device having the lock holds onto such lock. If the lock-requesting master device supports a timeout wait operation, such master device acquires lock of busing of DCR controller 205 generally as soon as the current locking master device releases the lock. On the other hand, if the lock-requesting master device does not support a timeout wait and if the current locking master device holds onto the current lock for a sufficient amount of time, a DCR timeout for the lock-requesting master device may occur, resulting in an unsuccessful attempt to lock, namely the lock bit is not set in status and control register 322. Accordingly, an external master device 260 that does not support a timeout wait operation may do a readback of status and control register 322 to confirm a successful lock.

For auto bus lock locking, a master device writes to indirect mode address register 320 to update an indirect address. DCR busing of DCR controller 205 is thus automatically locked for that master device until it reads from or writes to indirect mode access register 321 to release the lock. This auto lock operation may be disabled by clearing a bit in indirect mode access register 321. While a DCR bus is locked by a master device, another master device may read but may not modify content of status and control register 322.

Figure 6:
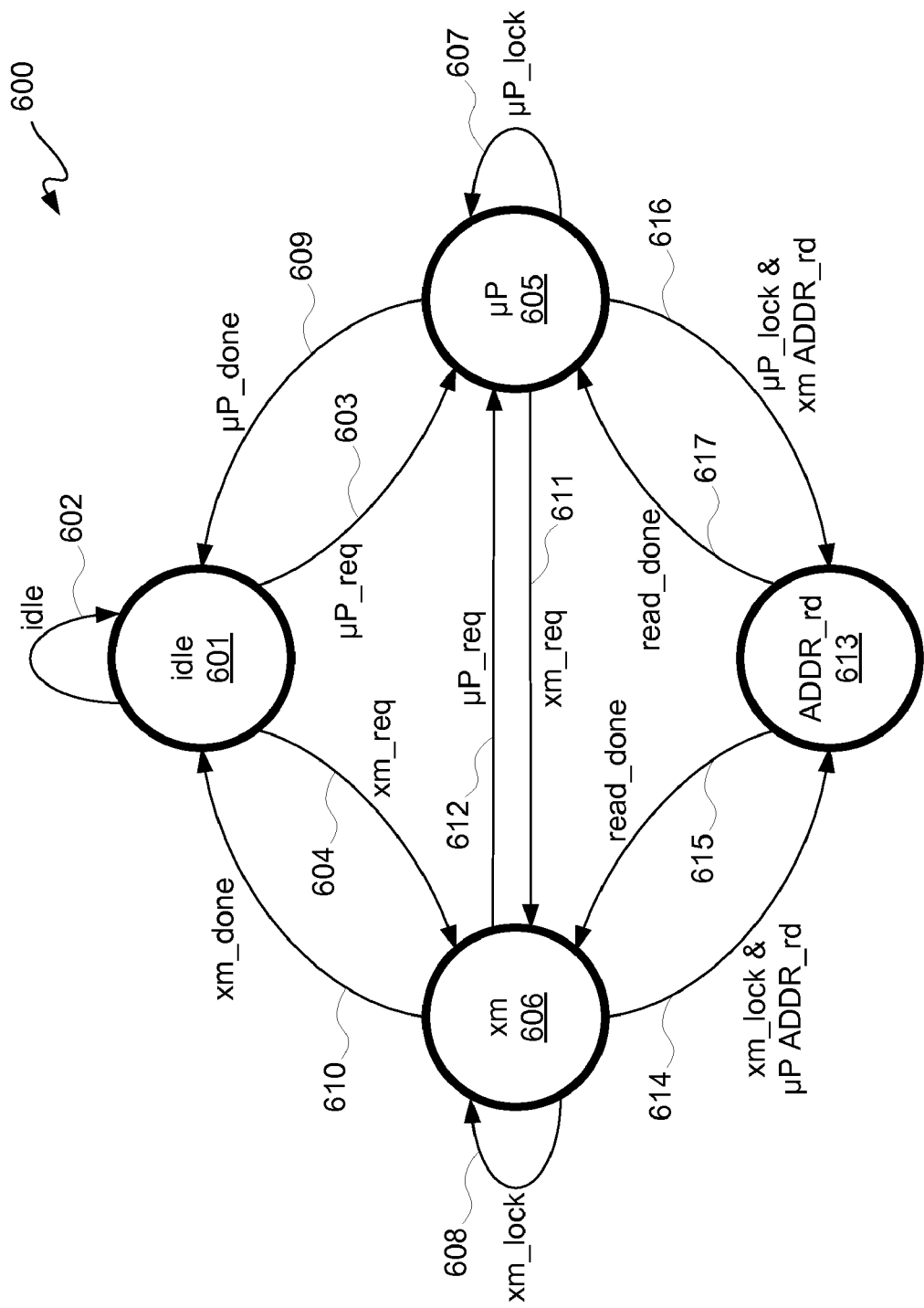
FIG. 6 is a state diagram depicting an exemplary embodiment of round robin arbitration with bus locking, state machine.

FIG. 6 is a state diagram depicting an exemplary embodiment of round robin arbitration with bus-locking state machine ("SM") 600. SM 600 may be part of WCRR arbitration block 503 of FIG. 5. SM 600, such as controls WCRR arbitration block 503, is in an idle state 601 when there is no DCR access to DCR controller 205. Such SM remains in such idle state as indicated by arrow 602 until a DCR access is requested.

From idle state 601, a request by a master device, such as a request by microprocessor 200 as indicated by arrow 603 or an external master device 260 request as indicated by arrow 604, causes SM 600 of DCR controller 205 to go into a microprocessor ("µP") bus lock state 605 or an external master ("xm") bus lock state 606, respectively. Simultaneous requests occurring within the same clock cycle may be subject to arbitration to determine which request is granted first. Such arbitration is previously described herein.

In states 605 or 606, WCRR arbitration block 503 remains in a locked state by the requesting master device as long as the lock persists, as respectively indicated by arrows 607 and 608. If after the lock condition there is no pending request when in states 605 or 606 as respectively indicated by arrows 609 and 610, SM 600 returns to idle state 601 after completion of the lock operation, as respectively indicated by arrows 609 and 610. If, however, there is another pending request from the other master device, then depending on which request was previously granted, the request for the other master is granted.

Thus, from state 605 a request by external master device 260 may be granted for transitioning to state 606 as indicated by arrow 611. Likewise, after completion of a lock operation for an external master 610 there may be a transition from state 606 to state 605 for a request by microprocessor 200 as indicated by arrow 612.

If a master device wishes to read status and control register 322 while busing of DCR controller 205 is locked by another master device, such master device may read status and control register as indicated by state 613. In state 606, if an external master device 260 has a lock condition, then from state 606 if microprocessor 200 provides an address for reading status and control register 322 as indicated by arrow 614, then a transition to address read state 613 for such a read to take place may occur. When such read is completed, state machine 600 may return to state 606 as indicated by arrow 615. Likewise, if state machine 600 is in state 605, and thus microprocessor 200 has a lock of DCR controller 205 busing, and external master device 260 provides an address for reading status and control register 322 as generally indicated by arrow 616, then such state machine 600 may transition to address read state 613 for reading any bits set in status and control register 322. After such reading of bits in status and control register 322 is completed, then state machine 600 may transition from state 613 back to state 605 as generally indicated by arrow 617.

Figure 7:
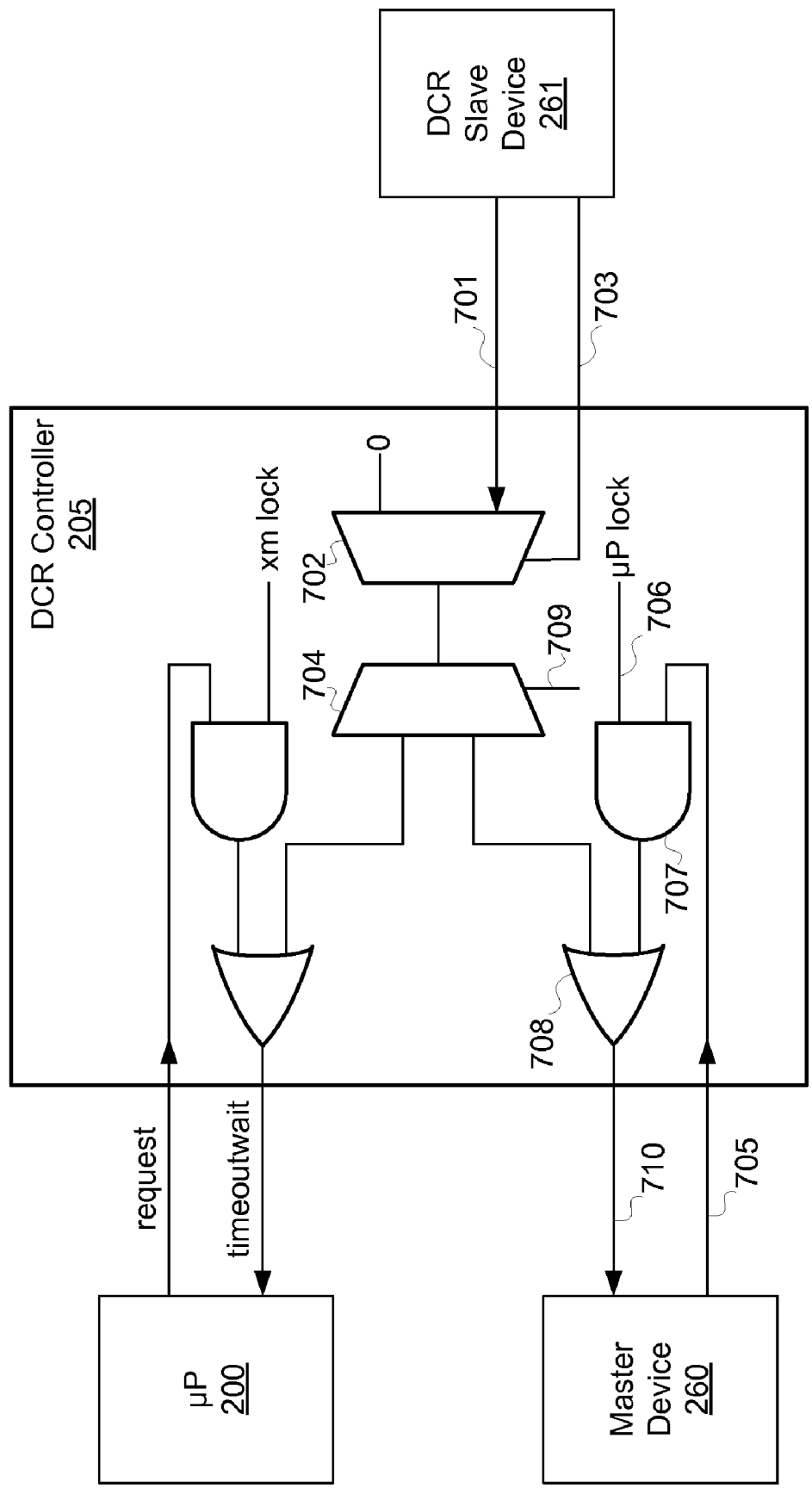
FIG. 7 is a block/schematic diagram depicting an exemplary embodiment of a system of master and slave devices coupled to DCR controller and configured for a timeout wait mode of operation.

FIG. 7 is a block/schematic diagram depicting an exemplary embodiment of a system of master and slave devices coupled to DCR controller 205 and configured for a timeout wait mode of operation. Timeout wait signal 701 is sent from a DCR slave device 261 to DCR controller 205, such as a multiplexer 702. Another input to multiplexer 702 may be tied to a logic level, such as a logic low level for those instances when timeout wait signal 701 is not asserted. Additionally, DCR slave device 261 may assert a select signal 703 for selecting timeout wait signal 701 as output from multiplexer 702. Timeout wait signal 701 may be used by DCR controller 205 to inhibit a timeout counter in a master device from counting. Of note, internal DCR slave devices of processor block 110 may not generate timeout wait signal 701. Accordingly, DCR slave device 261 may be instantiated in FPGA fabric 290.

Output of multiplexer 702 is provided to demultiplexer 704. If a DCR bus of DCR controller 205 is locked by a master device, such as microprocessor 200, timeout wait signal 701 is propagated to another master device, such as master device 260 instantiated in FPGA fabric 290, to temporarily stall any timeout wait counter thereof. This inhibiting of a timeout wait counter for a bus lock period is thus not counted as part of a wait time for such other master device, namely external master device 260 in this example.

Thus, for example, if an external master device 260 makes a request as indicated by signal 705 and microprocessor 200 has locked DCR controller 205 as indicated by microprocessor lock signal 706, then output of AND gate 707 is logic high. Output of AND gate 707 is provided to OR gate 708. If master select signal 709 provided to a control select port of demultiplexer 704 is set for selecting external master device 260, then timeout wait signal 701 is propagated to another input of OR gate 708. Accordingly, timeout wait signal 701 may be propagated as the output of OR gate 708 to external master device 260, as generally indicated by signal 710. If DCR controller 205 busing is locked by external master device 260 and microprocessor 200 makes a request, the same description applies, though an external master lock signal is asserted to an AND gate associated with control logic of DCR controller 205 for microprocessor 200. As the description for such operation would be repetitive, it is avoided for purposes of clarity.

Figure 8:
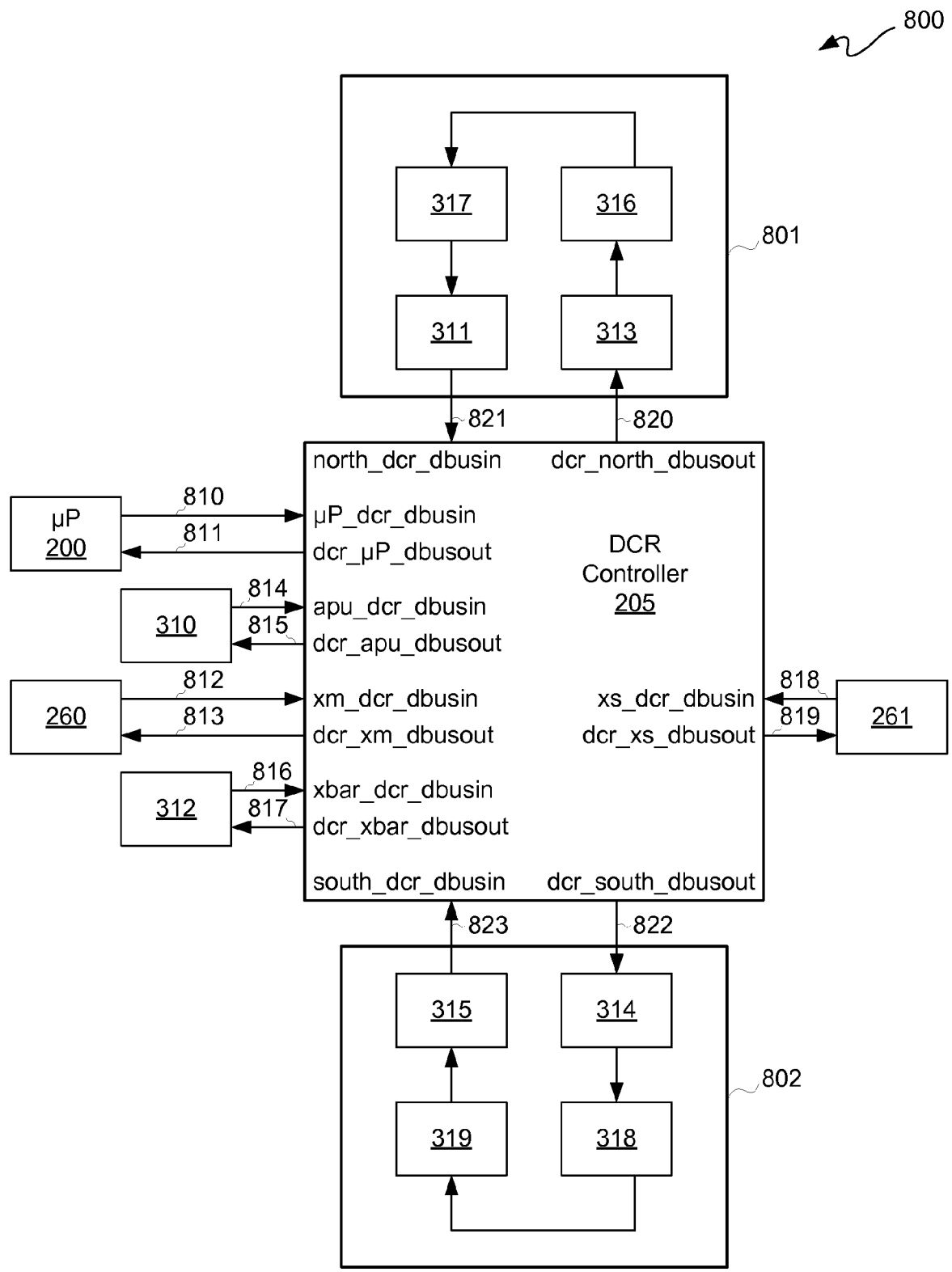
FIG. 8 is a block diagram depicting an exemplary embodiment of a mixed daisy-chain and distributed-OR topology.

As previously described, a mix of daisy-chain and distributed-OR DCR bus topology may be used with DCR controller 205. FIG. 8 is a block diagram depicting an exemplary embodiment of a mixed daisy-chain and distributed-OR topology 800. To reduce possible routing congestion of a place and route operation, DCR bus topology 800 may be a based on a floor plan of processor block 110 where DCR slave devices are coupled to DCR controller 205 through a mix of both daisy-chains, such as daisy-chains 801 and 802, and distributed-OR topology as illustratively shown in FIG. 8.

In FIG. 8, there are five slave DCR branches and two master DCR branches. For the two master DCR branches, one is for microprocessor 200 coupled to separate data bus input and data bus output for communication with DCR controller 205, as generally indicated by arrows 810 and 811, respectively. The other master DCR branch is for coupling of DCR master device 260 instantiated in FPGA fabric 290, which is coupled to DCR controller 205 by separate data input and output buses as generally indicated by arrows 812 and 813, respectively. Address buses and other control signals are directly connected between DCR controller 205 and master and slave devices coupled thereto, and are not shown for purposes of clarity and not limitation.

DCR slave block 310, which is for an APU controller 206, is coupled to DCR controller 205 via respective data input and output buses, as generally indicated by arrows 814 and 815, respectively. Likewise, DCR slave block 312 for crossbar 299 is coupled to DCR controller 205 via separate data input and output buses as generally indicated by arrows 816 and 817, respectively. Furthermore, DCR slave device 261 instantiated in FPGA fabric 290 is coupled to DCR controller 205 via respective input and output buses, as generally indicated by arrows 818 and 819. These separate input and output examples of buses coupled directly between DCR controller 205 and DCR slave and master devices may all be part of as OR bus topology.

Output from a data output bus from DCR controller 205 as generally indicated by arrow 820 is provided to DCR slave block 313 for SPLB interface 214. DCR slave block 316 for DMA interface 216 is coupled to receive output from DCR slave block 313. Output from DCR slave block 316 is provided to DCR slave block 317, and DCR slave block 317 is for DMA interface 217. Lastly, with respect to daisy-chain 801, DCR slave block 311 for memory controller interface 212 is coupled to receive output from DCR slave block 317, and output from DCR slave block 311 is provided to a data input bus of DCR controller 205 as generally indicated by arrow 821. Thus, daisy-chain 801, which may be referred to as "daisy-chain north" 801, forms one daisy-chain.

Another daisy-chain is formed as "daisy-chain south" 802 with a sequence of blocks, namely blocks 314, 318, 319, and 315, from a data output bus, as generally indicated by arrow 822, through to input to a data input bus, as generally indicated by arrow 823. Because daisy-chain south 802 is similar to daisy-chain north 801, repeated description is avoided for purpose of clarity.

All eleven DCR slave devices described with reference to FIG. 8 may receive individual read and write signals, and further individually receive an address bus that is up to 12 bits wide, as previously described. DCR controller 205 provides five write data buses, namely data bus outs or data bus outputs, for the above described five slave DCR branches and receives five read data buses, namely data bus ins or data bus inputs, from the same five slave DCR branches.

Each daisy-chain 801 and 802 is coupled via a pair of write and read data buses. Data buses of daisy-chains 801 and 802 are coupled to circulate data around in a looping manner, where each slave DCR device of a daisy-chain passes along input write data from an input write data bus to its output port if the slave device is not being read. If the slave device is being read, then the read data becomes the outgoing data. Accordingly, a bypass multiplexer along with a bypass path, though not illustratively shown in FIG. 8, may be used for each of the blocks forming daisy-chains 801 and 802. Read data from all five slave DCR branches may be merged together through a distributed OR arrangement, also not shown in FIG. 8, before being sent to one of the DCR masters, namely microprocessor 200 or DCR master device 260. Additionally, acknowledgment signals from all eleven slave devices may be logically ORed together and sent to a DCR master device.

Figure 9:
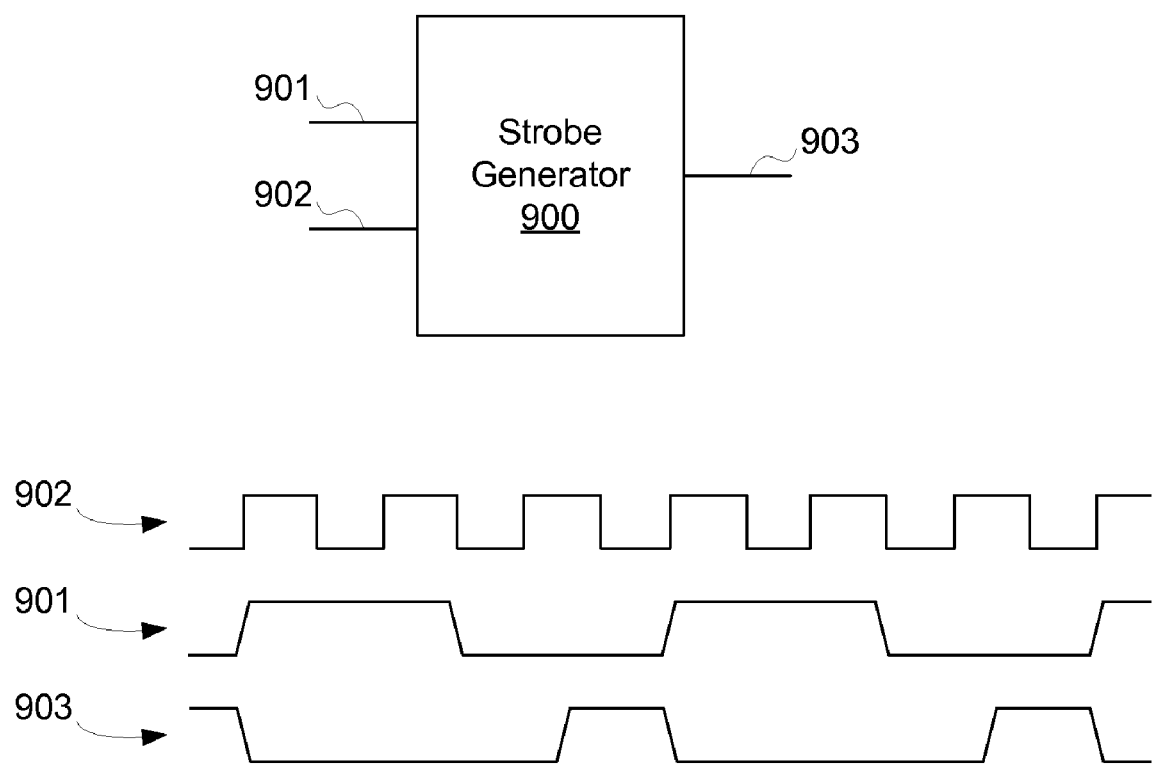
FIG. 9 is a block diagram depicting an exemplary embodiment of timing signals that may be used with a strobe generator.

Referring back to FIG. 2B, sync block 254 and 255 may each include a strobe generator. FIG. 9 is a block diagram depicting an exemplary embodiment of timing signals that may be used with a strobe generator 900. Strobe generator 900 receives a DCR clock and a controller main clock, namely DCR clock signal 901 and controller main clock signal 902. Responsive to signals 901 and 902, strobe generator generates a strobe signal 903.

In a synchronous mode, outbound signals from DCR controller 205 are transferred from a clock domain of main clock signal 902 to a clock domain of DCR clock 901, namely from the frequency associated with crossbar 299 to a frequency associated with FPGA fabric 290. Furthermore, in a synchronous mode, inbound signals to DCR controller 205 are sampled at the frequency of DCR clock signal 901 through the use of strobe signal 903.

Strobe generator 900 may automatically detect a clock frequency ratio between edges of synchronous DCR clock signal 901 and controller main clock signal 902 for clock ratios that are an integer ratio within a range of strobe generator 900, such as between 1:1 and 1:16. Strobe generator 900 produces one cycle wide strobes which may be used as clock enable signals to qualify both inbound and outbound signals from DCR controller 205.

Figure 10:
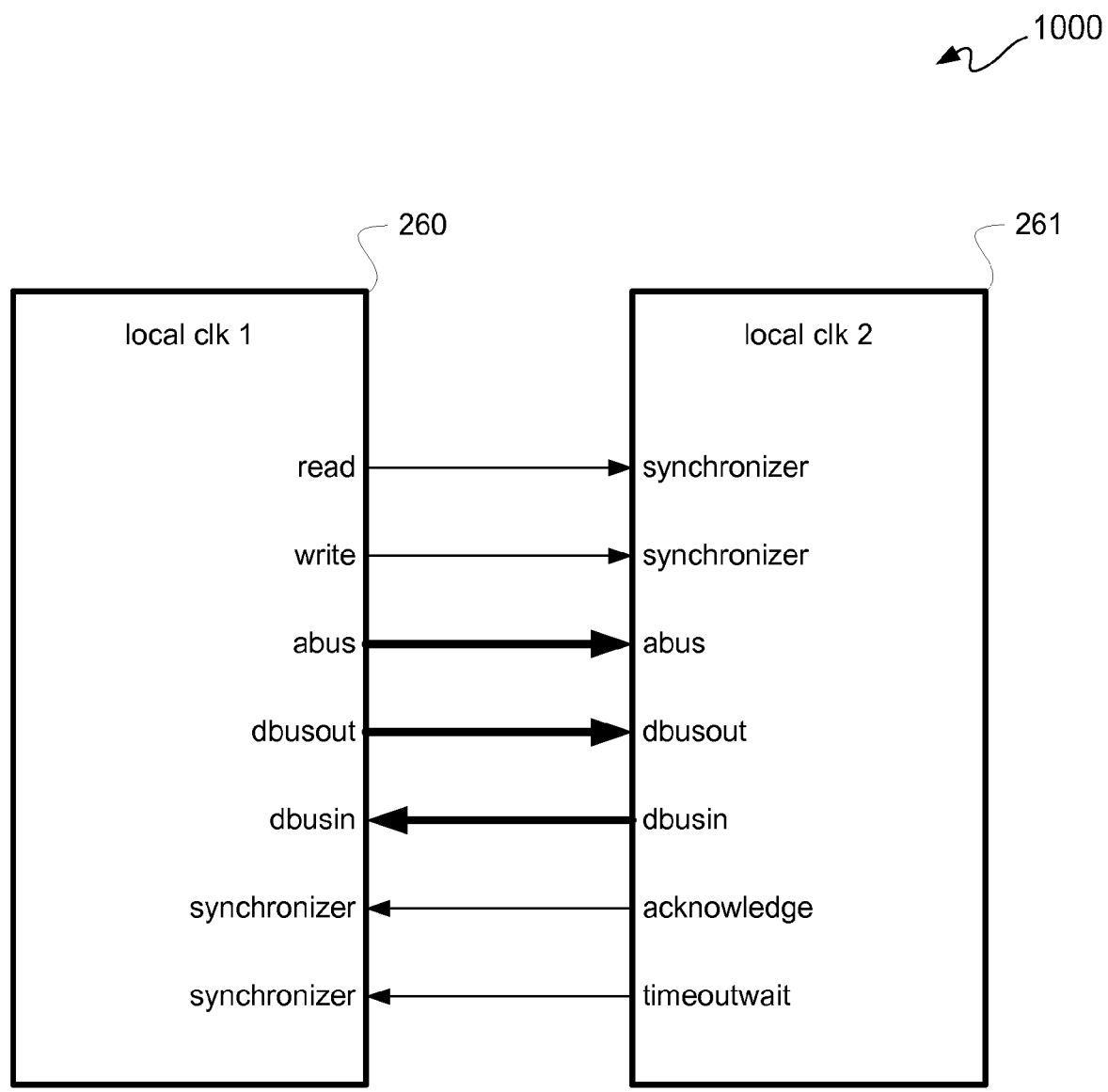
FIG. 10 is a block diagram depicting an exemplary embodiment of an asynchronous interface mode.

In an asynchronous mode, synchronization of interface signals may be used. FIG. 10 is a block diagram depicting an exemplary embodiment of an asynchronous interface mode 1000, where DCR controller 205 of FIG. 2B for example has been omitted for purposes of clarity and not limitation. For asynchronous mode 1000, synchronization is such that read and write command signals from a master device, such as master device 260, are synchronized by a slave device, such as slave device 261, receiving such read and write command signals. The synchronizer may be synchronizer 255 of FIG. 2B with respect to DCR slave device 261. Acknowledge and timeout signals sent from slave device 261 may be synchronized by a master device receiving such signals by synchronizer 254 of FIG. 2B. Address bus signals and data bus signals may be synchronized through a DCR protocol.

Figure 11:
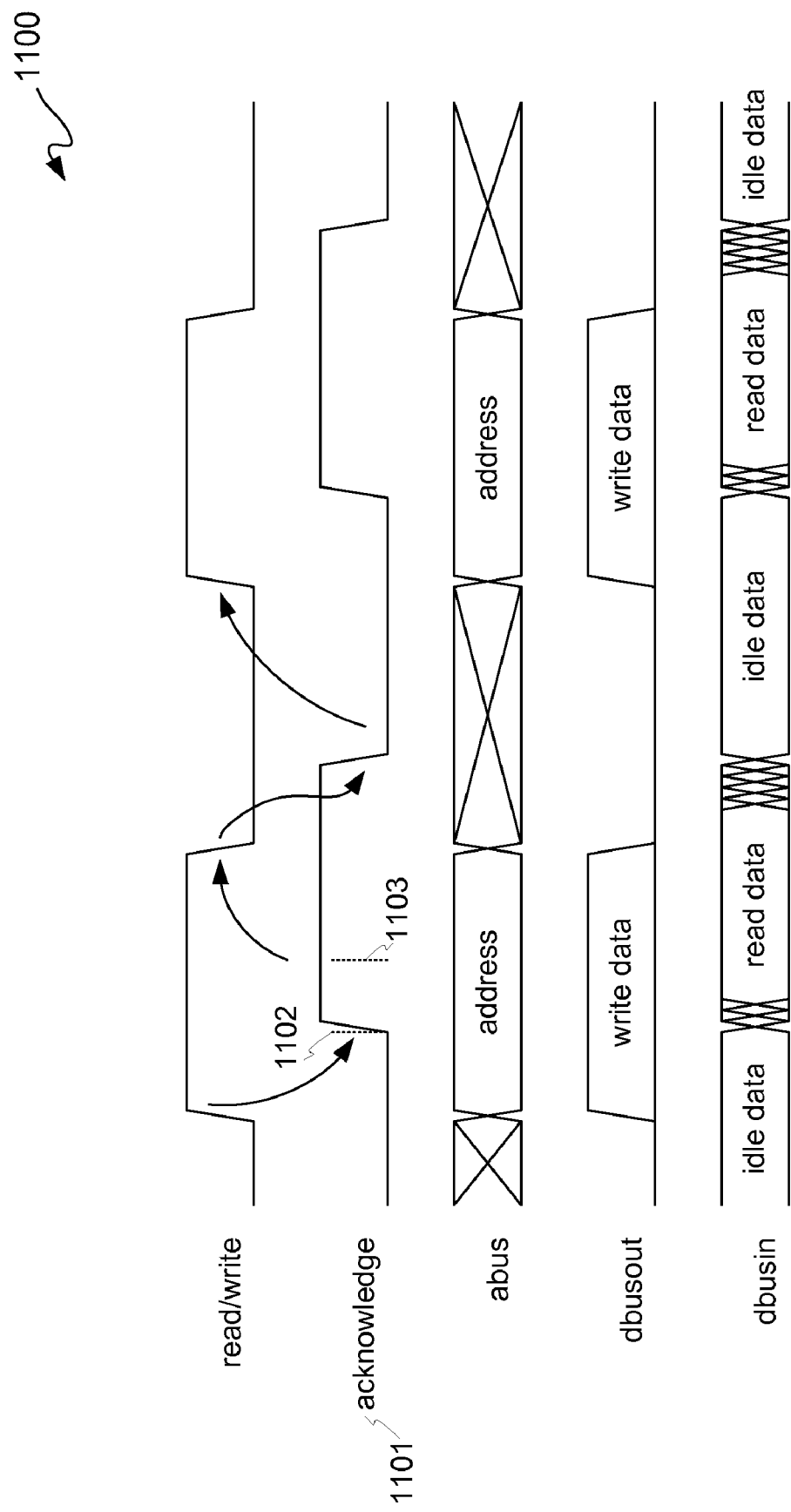
FIG. 11 is a timing diagram depicting an exemplary embodiment of a DCR timing.

FIG. 11 is a timing diagram depicting an exemplary embodiment of a DCR timing 1100. DCR timing diagram 1100, where clocks are not shown for purposes of clarity, is applicable to both synchronous and asynchronous modes.

A DCR slave device asserts an acknowledge signal 1101 when a write operation is complete or when read data has been placed on a data input bus. As a result of either of these two conditions, the DCR slave device may sample the write data at time 1102, and a DCR master device may sample read data at time 1103. Data bus input buses from internal DCR slaves of processor block 110 may be driven to a logic 0 level when not active. DCR controller 205 may drive bypass data, namely where the data input bus is the same as the data output bus owing to a DCR slave device being bypassed as previously described, onto a data input bus for both external and internal master devices when not active, such as master device 260 and microprocessor 200, respectively.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A processor block, comprising:
a device control register controller;
device control register slave blocks coupled to the device control register controller and having access to device registers for a plurality of interfaces of the processor block;
a master device interface for coupling at least one slave device external to the processor block to the device control register controller;
a slave device interface for coupling a master device external to the processor block to the device control register controller;
the device control register controller is configured for both direct and indirect addressing; and
address logic configured for a direct addressing mode using a first address space for access to the plurality of interfaces internal to the processor block;
the address logic further configured for an indirect addressing mode using a second address space larger than the first address space for access to the at least one slave device external to the processor block.

2. The processor block according to claim 1, wherein:
the device control register controller has reserved address space for an address mode register and an access mode register thereof;
the address mode register for storing an address associated with the indirect addressing mode; and
the access mode register for storing mode bits for setting either of the indirect addressing mode or the direct addressing mode.

3. The processor block according to claim 1, wherein the device control register controller includes an arbitration block for arbitrating access to bandwidth associated with the device control register controller as between a microprocessor internal to the processor block and the master device coupled externally with respect to the processor block.

4. The processor block according to claim 1, wherein the device control register controller includes a state machine configured for locking busing thereof for atomic operations by either of the master device coupled externally with respect to the processor block or a microprocessor internal to the processor block.

5. The processor block according to claim 4, wherein:
the device control register controller is configured to pass a timeout signal from the at least one slave device external to either of the master device coupled externally with respect to the processor block or the microprocessor internal to the processor block; and
the timeout signal being for tolling a timeout period by a lock period of either of the master device coupled externally with respect to the processor block or the microprocessor internal to the processor block having a lock of the busing.

6. The processor block according to claim 4, wherein:

the device control register controller is configured for a mix of daisy-chain and OR bus topologies;

a portion of the plurality of interfaces being daisy chained for access via a first input bus and a first output bus of the device control register controller;

a second input bus and a second output bus of the device control register controller being directly coupled to one master selected from a group consisting of the master device coupled externally with respect to the processor block and the microprocessor internal to the processor block;

a third input bus and a third output bus of the device control register controller being directly coupled to one slave selected from a group consisting of the at least one slave device coupled externally with respect to the processor block, a DCR crossbar interface of the processor block, and an auxiliary processing unit interface; and branches associated with the first output bus and the third output bus are merged through a distributed OR arrangement to merge read data for being sent to the second input bus.

7. The processor block according to claim 6, wherein the branches associated with the first output bus and the third output bus are merged through the distributed OR arrangement to merge acknowledgement signals for being sent to the second input bus.

8. The processor block according to claim 1, wherein the device control register controller is configurable for an asynchronous mode and a synchronous mode of operation with respect to the at least one slave device coupled externally with respect to the processor block.

9. The processor block according to claim 1, wherein the device control register controller is configurable for an asynchronous mode and a synchronous mode of operation with respect to the master device coupled externally with respect to the processor block.

10. A method for device control register ("DCR") addressing, comprising:

performing a first DCR operation to write a first address to a first indirect mode address register;

performing a second DCR operation;

the second DCR operation being a write or read to a second indirect mode address register;

the second indirect mode address register, if visible, indicates an indirect address mode that includes indirect DCR writes and reads;

selecting the first address stored in the first indirect mode address register for output responsive to the performing of the second DCR operation;

partial address decoding the first address; and selecting a first slave control register device responsive to the partial address decoding of the first address.

11. The method according to claim 10, further comprising:

performing a third DCR operation to write a second address to a DCR address bus;

selecting the second address for output responsive to not repeating the second DCR operation;

partial address decoding the second address; and selecting a second slave control register device responsive to the partial address decoding of the second address.

12. The method according to claim 11, wherein the first slave control register device is selected from a plurality of internal slave control register devices.

13. The method according to claim 12, wherein the plurality of internal slave control register devices are internal to an embedded processor block.

14. The method according to claim 13, wherein the second slave control register device is selected from a plurality of instantiated slave control register devices, the instantiated slave control register devices being instantiated in programmable logic.

15. The method according to claim 14, wherein the instantiated slave control register devices are external to the embedded processor block.

\* \* \* \* \*